(12) United States Patent
Fukasawa (10) Patent No.: US 7,984,302 B2
(45) Date of Patent: Jul. 19, 2011

(54) ELECTRONIC DOCUMENT MANAGEMENT APPARATUS, ELECTRONIC DOCUMENT MANAGEMENT METHOD, AND COMPUTER PROGRAM

(75) Inventor: Yusuke Fukasawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 11/742,920

(22) Filed: May 1, 2007

(65) Prior Publication Data

US 2007/0266253 A1 Nov. 15, 2007

(30) Foreign Application Priority Data

May 12, 2006 (JP) ................................. 2006-134320

(51) Int. Cl.
*H04L 9/00* (2006.01)

(52) U.S. Cl. .............................. 713/177; 726/26; 726/30

(58) Field of Classification Search .................. 713/176, 713/180; 726/30

See application file for complete search history.

(56) References Cited

U.S. PATENT DOCUMENTS

| | | | | |
|---|---|---|---|---|
| 5,748,738 A * | 5/1998 | Bisbee et al. | ................. | 713/176 |
| 6,237,096 B1 * | 5/2001 | Bisbee et al. | ................. | 713/178 |
| 6,895,507 B1 * | 5/2005 | Teppler | ........................... | 726/19 |
| 6,948,069 B1 * | 9/2005 | Teppler | ........................ | 713/178 |
| 7,167,986 B2 * | 1/2007 | Hughes et al. | ............... | 713/178 |
| 7,249,258 B2 * | 7/2007 | Honda et al. | .................. | 713/176 |
| 2001/0002485 A1 * | 5/2001 | Bisbee et al. | ................. | 713/167 |
| 2002/0056042 A1 * | 5/2002 | van der Kaay et al. | ....... | 713/178 |
| 2003/0159048 A1 * | 8/2003 | Matsumoto et al. | ......... | 713/178 |
| 2004/0003255 A1 * | 1/2004 | Apvrille et al. | .............. | 713/178 |
| 2004/0181756 A1 * | 9/2004 | Berringer et al. | ............ | 715/530 |
| 2004/0250099 A1 * | 12/2004 | Pravetz et al. | ............... | 713/193 |
| 2005/0160272 A1 * | 7/2005 | Teppler | ........................ | 713/178 |
| 2006/0075245 A1 * | 4/2006 | Meier | ........................... | 713/176 |

FOREIGN PATENT DOCUMENTS

EP 0940945 A2 * 8/1999
JP 11-338780 A 12/1999

* cited by examiner

*Primary Examiner* — Ponnoreay Pich
(74) *Attorney, Agent, or Firm* — Canon USA, Inc. IP Division (57) ABSTRACT

An apparatus includes a digital signature verification data embedding unit and a signing unit. The digital signature verification data embedding unit is configured to embed digital signature verification data for use in verification of a digital signature for an electronic document into the electronic document. The signing unit is configured to sign the electronic document with a digital signature whose validity can be verified using digital signature verification data embedded in the electronic document.

7 Claims, 10 Drawing Sheets

ELECTRONIC DOCUMENT MANAGEMENT APPARATUS, ELECTRONIC DOCUMENT MANAGEMENT METHOD, AND COMPUTER PROGRAM

BACKGROUND OF THE INVENTION

1. Field of the Invention

The present invention relates to an electronic document management apparatus, an electronic document management method, and a computer program. In particular, the present invention is suited for use in management for electronic documents.

2. Description of the Related Art

Various documents (e.g., financial and tax documents) are required by law to be stored as paper media. However, with the recent advances of information technology (IT), a law that essentially allowing electronic storage of finance and tax documents and vouchers that used to be required by law to be stored as paper media went into effect. One example of such a law is the so-called e-Document Law (Japan).

Due to the effect of such a law, documents converted into electronic form by scanners (hereinafter, referred to as electronic documents) can be treated as legal evidence. To ensure authenticity of electronic documents, it is desirable to disable or at least detect tampering with electronic documents.

Japanese Patent Laid-Open No. 11-338780 discloses a technique for certification and safe storage of electronic documents for subsequent verification and retrieval. In this technique, a document certificate is generated that includes a document fingerprint generated by applying a hash function to an electronic document and a time stamp indicating the time of certification of the document. A digital signature corresponding to the document certification is generated, and the generated digital signature and document certification are transmitted to a user and managed in the same database as that for the electronic document. The use of such a document certification and a digital signature enables a user to verify the authenticity of copies of an original electronic document.

Unfortunately, for this known technique, the association of an electronic document with a document certification can be broken. If the association is broken, it is very difficult to verify that the electronic document has not been tampered with.

Therefore, the conventional techniques described above suffer from a number of disadvantages in verifying for the long term that an electronic document has not been tampered with.

SUMMARY OF THE INVENTION

An embodiment of the present invention provides a technique for reliably verifying for the long term that an electronic document has not been tampered with.

According to an aspect of the present invention, an embodiment is directed to an apparatus including a digital signature verification data embedding unit and a signing unit. The digital signature verification data embedding unit is configured to embed digital signature verification data for use in verification of a digital signature for an electronic document into the electronic document. The signing unit is configured to sign the electronic document with a digital signature whose validity can be verified using digital signature verification data embedded in the electronic document.

Further features of the present invention will become apparent from the following description of exemplary embodiments (with reference to the attached drawings).

DESCRIPTION OF THE EMBODIMENTS

Embodiments of the present invention will now be described below with reference to the drawings, in which like reference characters designate the same or similar parts throughout there of. In an embodiment, a mechanism for storing an electronic document for the long term will be described. For example, ISO (International Organization for Standardization) and JIS (Japanese Industrial Standards) define storage conditions of long term storage. And more and more laws in the world oblige users to store electronic documents for a long term (e.g., for a year or 5 years or 30 years more).

System Configuration

Figure 1:
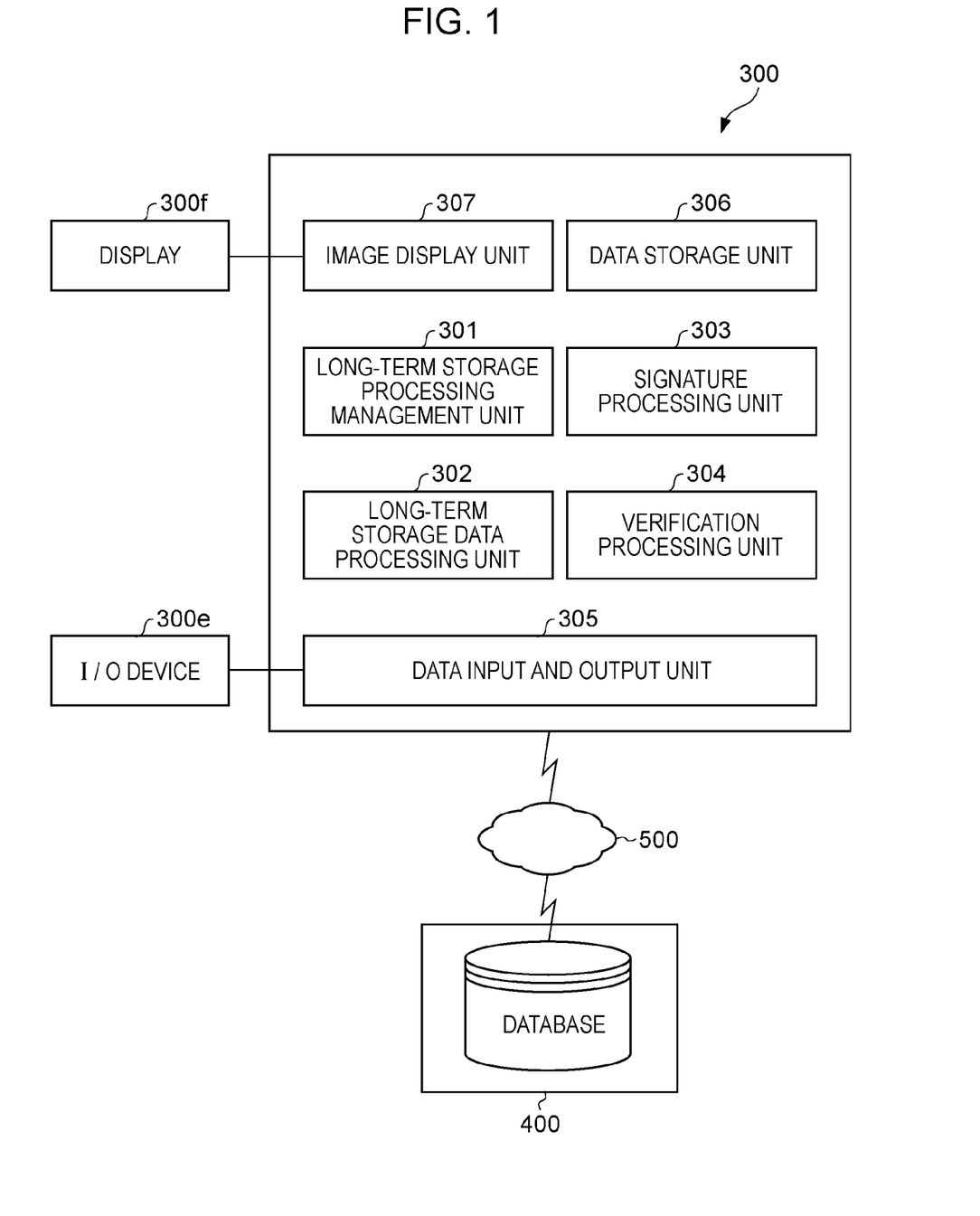
FIG. 1 is a block diagram of an example of the configuration of a document management system according to an embodiment of the present invention.

FIG. 1 is a block diagram of an example of the configuration of a document management system according to the present embodiment. In FIG. 1, a client terminal apparatus 300 is an information processing apparatus that includes a computer functioning as an electronic document management apparatus. The client terminal apparatus 300 includes, as its functions, a long-term storage processing management unit 301, a long-term storage data processing unit 302, a signature processing unit 303, a verification processing unit 304, a data input and output processing unit 305, an image display unit 307, and a data storage unit 306. The client terminal apparatus 300 is connected to an external database apparatus 400 over a network 500, such as telephone lines, a local area network (LAN), and the Internet. The LAN is connected to a printing apparatus that performs printing in response to a print job transmitted from the client terminal apparatus 300.

The data storage unit 306 holds an application data file generated by an application program (e.g., such as a document processing application (not shown)) and/or a structured electronic document, typified by a portable document format (PDF) document. The data storage unit 306 also holds a database for a software resource and a hardware resource included in the client terminal apparatus 300.

In order to store for the long term a structured electronic document, typified by a PDF document, the long-term storage processing management unit 301 controls processing units, such as the long-term storage data processing unit 302, the signature processing unit 303, and the verification processing unit 304, and generates and updates an electronic document to be stored for the long term. The long-term storage data processing unit 302 generates and verifies long-term storage data for use in verification of an electronic document. The signature processing unit 303 places a signature (digital signature) and a time stamp on an electronic document. The verification processing unit 304 verifies a signed (digitally signed) and time-stamped electronic document using long-term storage data. Long term storage data is one of the examples of digital signature verification data.

The data input and output processing unit 305 is connected to the database apparatus 400 via the network 500. The data input and output processing unit 305 is also connected to an input and output device 300e (e.g., a keyboard and a pointing device). The data storage unit 306 is connected to a display 300f and causes the display 300f to display various images. The database apparatus 400 is an information processing apparatus that includes a computer holding at least a database.

Hardware Configuration

Figure 2:
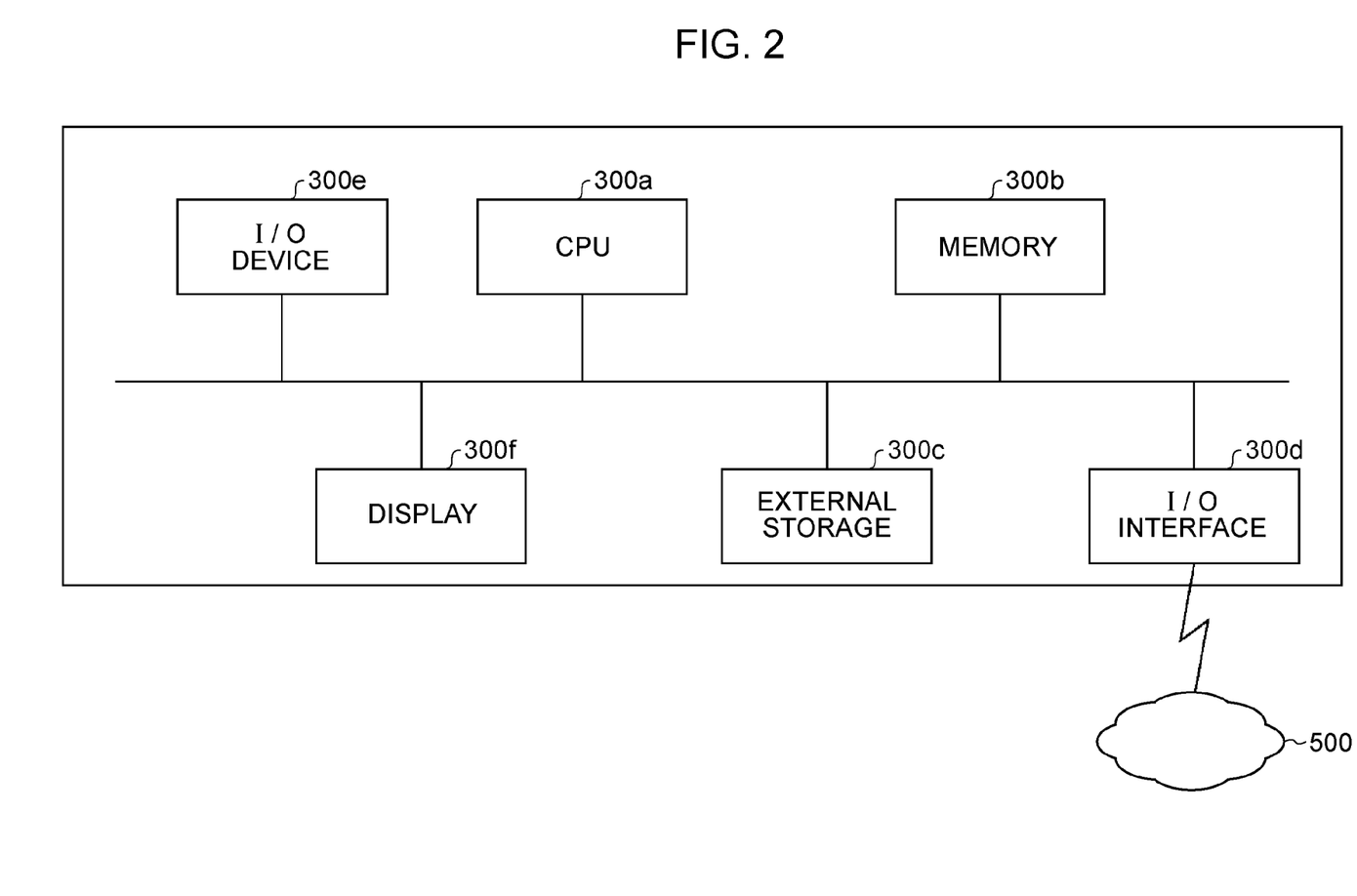
FIG. 2 is a block diagram of an example of hardware configuration of a client terminal apparatus according to the embodiment of the present invention.

FIG. 2 is a block diagram of an example of hardware configuration of the client terminal apparatus 300. In FIG. 2, the client terminal apparatus 300 includes a central processing unit (CPU) 300a, a memory 300b, an external storage 300c, an I/O interface 300d, the input and output device 300e, and the display 300f.

The CPU 300a performs various kinds of processing realizable in the client terminal apparatus 300 by executing a program stored in the memory 300b or the external storage 300c. The memory 300b includes, for example, a read-only memory (ROM) and a random-access memory (RAM). The external storage 300c includes, for example, a hard disk. A removable storage medium, such as a flexible disk, a compact-disk read-only memory (CD-ROM), or a digital versatile disc (DVD), may be provided as the external storage 300c. The image display unit 307, shown in FIG. 1, can be realized by using some or all area of the external storage 300c.

The display 300f displays an image. The client terminal apparatus 300 is connected to the network 500 via the I/O interface 300d. The input and output device 300e is a user interface, such as a keyboard or a pointing device. An operator performs an input operation as needed using the input and output device 300e. The database apparatus 400, shown in FIG. 1, can also be realized by using hardware shown in FIG. 2.

Format of Electronic Document For Being Stored for Long Term

Figure 3:
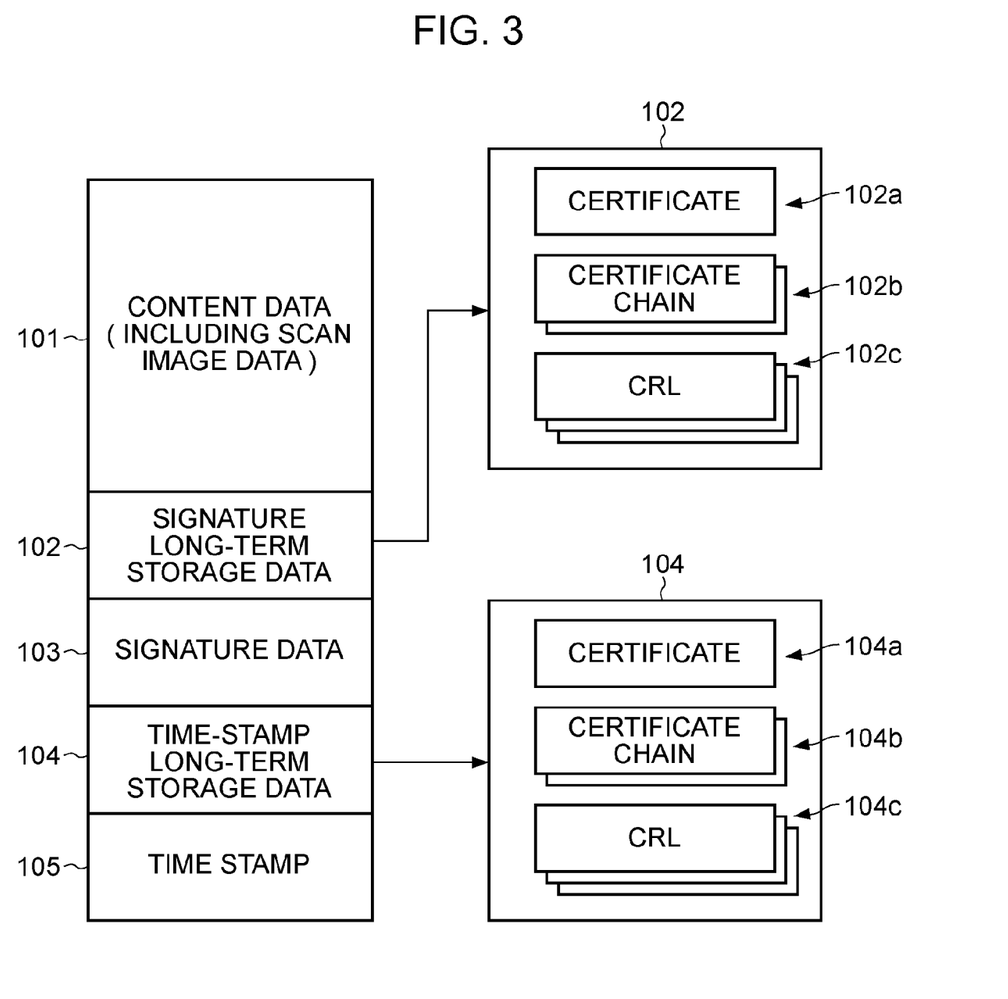
FIG. 3 shows an example of the structure of a long-term storage document according to the embodiment of the present invention.

FIG. 3 shows an example of the structure of an electronic document that includes long-term storage data (also referred to herein as "signature long-term storage data" or "digital signature verification data") being data for use in storing the electronic document for the long term and for use in verification of the electronic document. Hereinafter, an electronic document that includes the long-term storage data is referred to as a long-term storage document when necessary. The electronic-document format of the long-term storage document can be realized by, for example, expanding an existing structured document (e.g., PDF document), as shown in FIG. 3.

In FIG. 3, content data 101 is, for example, data that contains image information, text information, and graphics information (scan image data) and also contains data constituting the electronic document. Signature long-term storage data 102 is data for use in storing a long-term storage document for the long term. The signature long-term storage data 102 includes a digital certificate 102a required for placing a signature (digital signature), a certificate chain 102b, and a certification revocation list (CRL) 102c. The certificate chain 102b includes all digital certificates associated with a certification path to a Root (certificate authority). The certification path to the Root (certificate authority) can be obtained by using the digital certificate 102a. The CRL 102c is linked with the digital certificates included in the certificate chain 102b.

Signature data 103 is data (digital-signature data) whose effective area is the content data 101 and the signature long-term storage data 102. Time-stamp long-term storage data 104 includes a digital certificate 104a required for time stamping, a certificate chain 104b, and a CRL 104c, like the signature long-term storage data 102.

Figure 4:
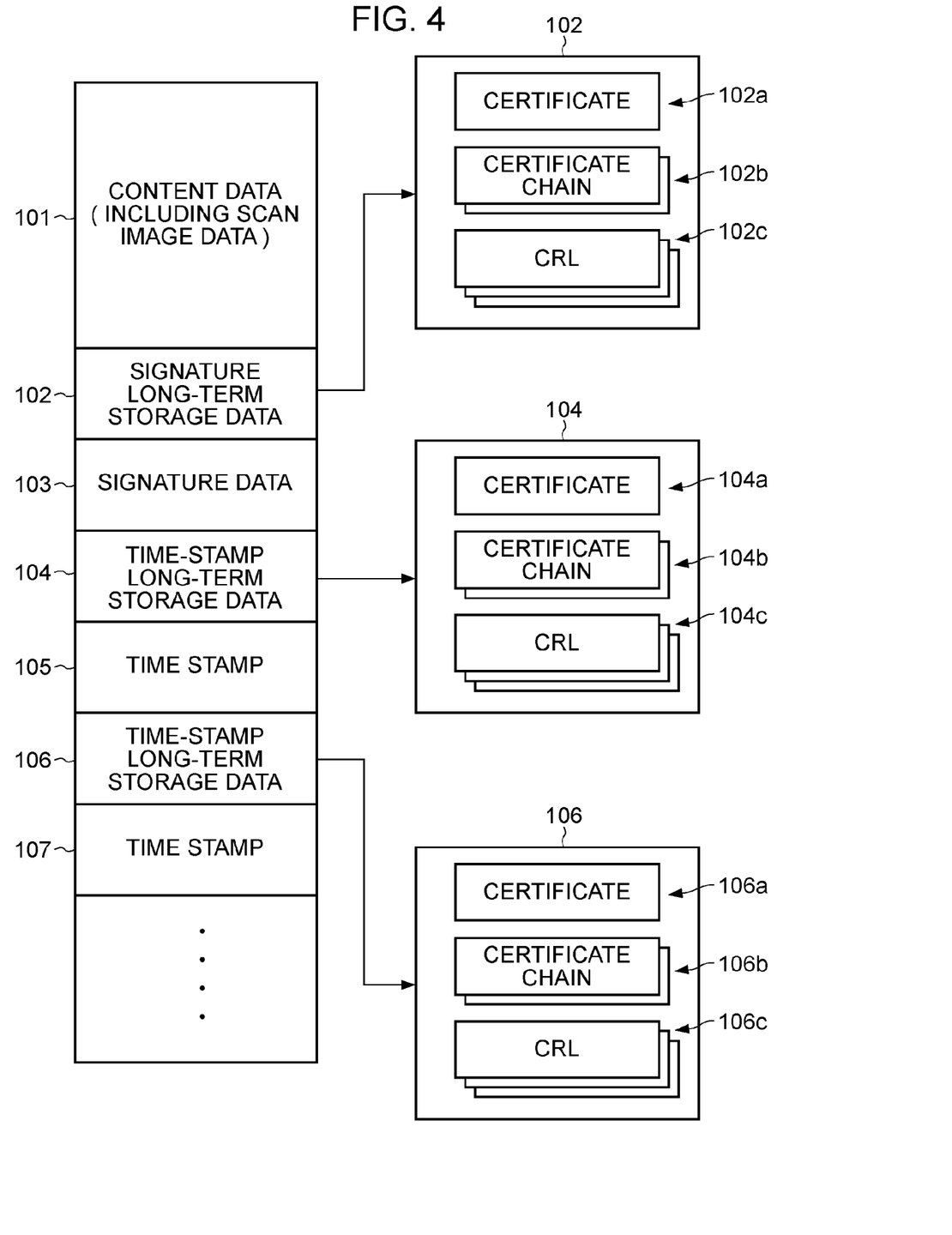
FIG. 4 shows an example of the structure of the long-term storage document with a time stamp according to the embodiment of the present invention.

A time stamp 105 is a time stamp whose effective area is the content data 101, the signature long-term storage data 102, the signature data 103, and the time-stamp long-term storage data 104. When a long-term storage document illustrated in FIG. 3 has not been tampered with, within the period of validity of a digital certificate for the time stamp 105 and while the digital certificate for the time stamp 105 remains unrevoked, time-stamp long-term storage data 106 and a time stamp 107 are obtained. Then, as illustrated in FIG. 4, the time-stamp long-term storage data 106 and the time stamp 107 are added into a long-term storage document illustrated in FIG. 3. This enables the long-term storage document to be stored for the long term.

Generation of Long-Term Storage Document (Conversion of Electronic Document into Long-Term Storage Document)

A process occurring when an electronic document is stored as a long-term storage document for the first time (an ordinary electronic document is converted into a long-term storage document illustrated in FIG. 3) will now be described with reference to the flowchart of FIG. 5. First, in step S501, the long-term storage processing management unit 301 obtains the digital certificate 102a for use in signature. The digital certificate 102a is, for example, a certificate issued by a trusted third party certificate authority (CA).

In step S502, the long-term storage data processing unit 302 generates the signature long-term storage data 102 (also referred to herein as "long-term storage data" or "digital signature verification data") using the digital certificate 102a obtained in step S501. The processing of step S502 will be described in greater detail below with reference to FIG. 6. In step S503, the signature processing unit 303 embeds the signature long-term storage data 102 generated in step S502 into an electronic document to be signed. In step S504, the signature processing unit 303 performs signature processing by embedding the signature data 103 into the electronic document. In an embodiment, the processing of step S503 and that of step S504 are performed substantially simultaneously. The processing of step S503 and that of step S504 will be described in greater detail below with reference to FIG. 7.

Then, in step S505, the long-term storage processing management unit 301 obtains the digital certificate 104a used for the time stamp 105. The issuer of the digital certificate 104a used for the time stamp 105 is, for example, a time stamp authority (TSA). In step S506, the long-term storage data processing unit 302 generates the time-stamp long-term storage data 104 using the digital certificate 104a obtained in step S505. The processing of step S506 is substantially the same as that of step S502.

Then, in step S507, the signature processing unit 303 embeds the time-stamp long-term storage data 104 generated in step S506 into the electronic document. In step S508, the signature processing unit 303 performs signature processing on the electronic document by embedding the time stamp 105 into the electronic document. In an embodiment, the processing of step S507 and that of step S508 are performed substantially simultaneously. The processing of step S507 and that of step S508 will be described in greater detail below with reference to FIG. 7. Through steps S501 to S508, a long-term storage document shown in FIG. 3 can be generated.

Generation of Long-Term Storage Data

Figure 5:
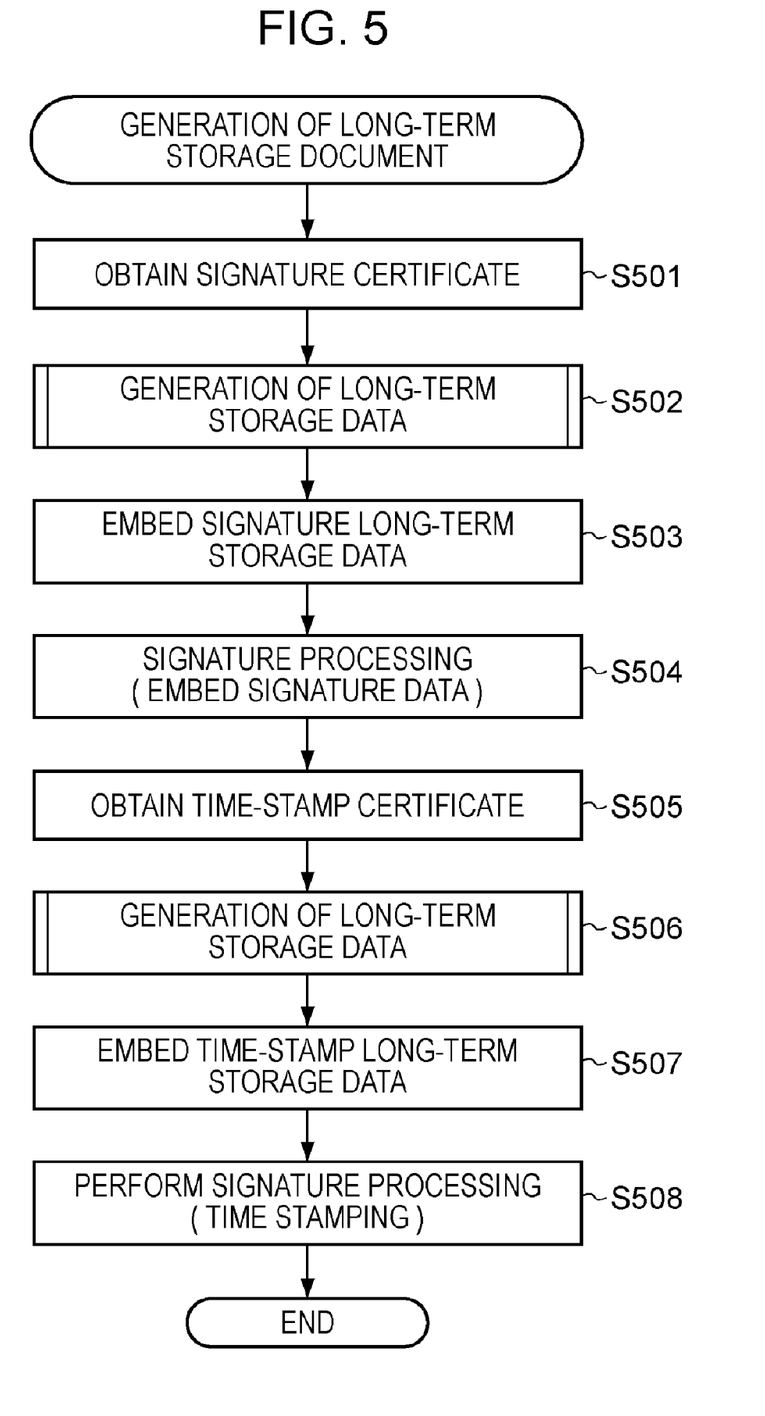
FIG. 5 is a flowchart of an example of the process occurring when an electronic document is stored as a long-term storage document for the first time according to the embodiment of the present invention.
Figure 6:
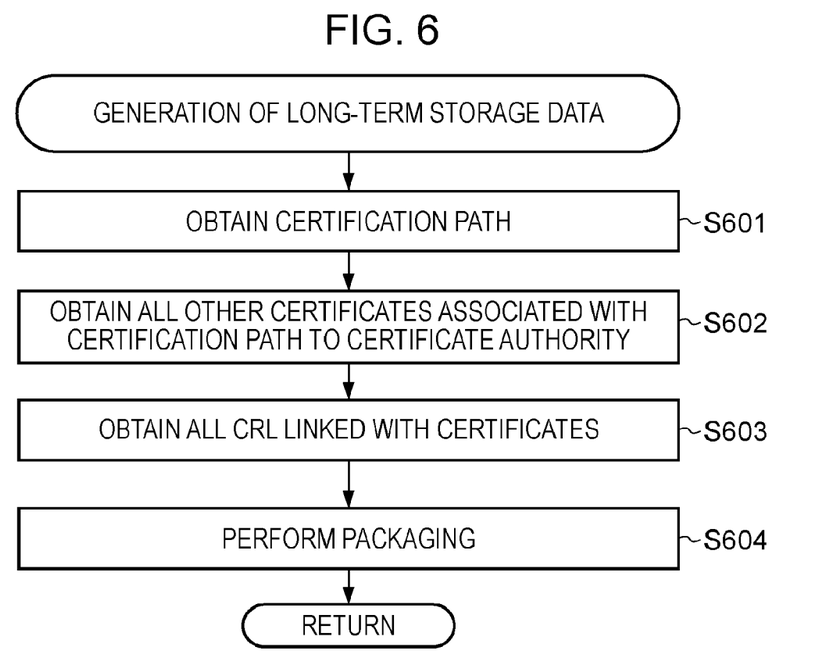
FIG. 6 is a flowchart of an example of the process for generating long-term storage data according to the embodiment of the present invention.

FIG. 6 is a flowchart of an example of the process for generating long-term storage data shown in steps S502 and S506 of FIG. 5. First, in step S601, the long-term storage data processing unit 302 obtains a certificate path (a path to a Root (certificate authority) that authenticates the digital certificate 102a (104a) using the digital certificate 102a (104a) obtained in step S501 (S505). Then, in step S602, the long-term storage data processing unit 302 obtains the certificate chain 102b (104b) (all other digital certificates associated with the certificate path). In step S603, the long-term storage data processing unit 302 obtains all CRL linked with the digital certificates obtained in step S602. Lastly, in step S604, the long-term storage data processing unit 302 packages the digital certificate 102a (104a) obtained in step S501 (S505), the certificate chain 102b (104b) in step S602, and the CRL 102c (104c) obtained in step S603 into a form that can be embedded in the electronic document. The packaged data is the signature long-term storage data 102 (time-stamp long-term storage data 104).

Embedding of Long-Term Storage Data and Embedding of Signature and Time Stamp

Figure 7:
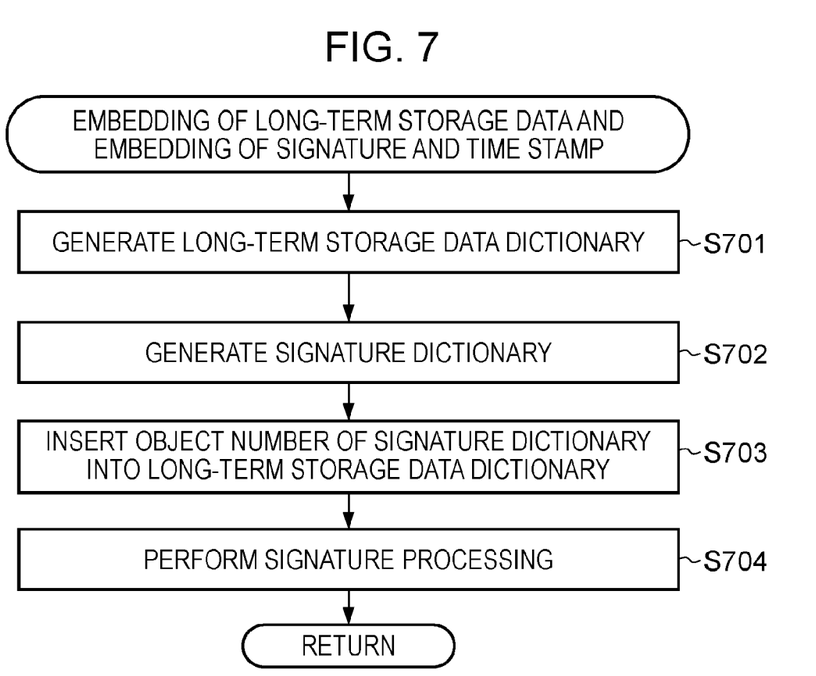
FIG. 7 is a flowchart of an example of the process for embedding signature long-term storage data and signature data and that for embedding time-stamp long-term storage data and a time stamp according to the embodiment of the present invention.

FIG. 7 is a flowchart of an example of the process for embedding the signature long-term storage data 102 and the signature data 103 and that for embedding the time-stamp long-term storage data 104 and the time stamp 105. The processing of embedding the signature long-term storage data 102 and that of embedding the signature data 103 are shown in steps S503 and S504 of FIG. 5, respectively. The processing of embedding the time-stamp long-term storage data 104 and that of embedding the time stamp 105 are shown in steps S507 and S508 of FIG. 5, respectively.

In an embodiment, when the signature data 103 and the time stamp 105 are placed on the electronic document, link information is added for linking each of the signature data 103 and the time stamp 105 with corresponding long-term storage data within the electronic document. By doing so, in verification of the electronic document, it is possible to perform verification of the signature data 103 (time stamp 105) and verification of the signature long-term storage data 102 (time-stamp long-term storage data 104) as a pair on the basis of the link information. If a time lag exists between when the signature long-term storage data 102 (time-stamp long-term storage data 104) is embedded into the electronic document and when the signature data 103 (time stamp 105) is embedded into the electronic document, the electronic document is subjected to the risk of tampering. Therefore, in accordance with an embodiment, the processing of embedding the signature long-term storage data 102 (time-stamp long-term storage data 104) and that of embedding the signature data 103 (time stamp 105) are substantially simultaneously performed.

In step S701 of FIG. 7, the signature processing unit 303 generates a dictionary for storing long-term storage data and enters the signature long-term storage data 102 (time-stamp long-term storage data 104) into the generated long-term storage data dictionary. All the information is embedded into the electronic document. Then, in step S702, the signature processing unit 303 generates a dictionary for storing signatures (time stamps). At this time, the signature processing itself has not been performed yet. After the signature processing is performed in step S704, the signature data 103 (time stamp 105) is stored into the signature dictionary (time-stamp dictionary).

Then, in step S703, the signature processing unit 303 obtains an object number of the signature dictionary (time-stamp dictionary) generated in step S702. The signature processing unit 303 then inserts the obtained object number of the signature dictionary (time-stamp dictionary) into the long-term storage data dictionary generated in step S701. This links the long-term storage data with the signature dictionary (time-stamp dictionary). Lastly, in step S704, the signature processing is performed, and then the signature data 103 (time stamp 105) is stored into the signature dictionary (time-stamp dictionary) generated in step S702.

Figure 8:
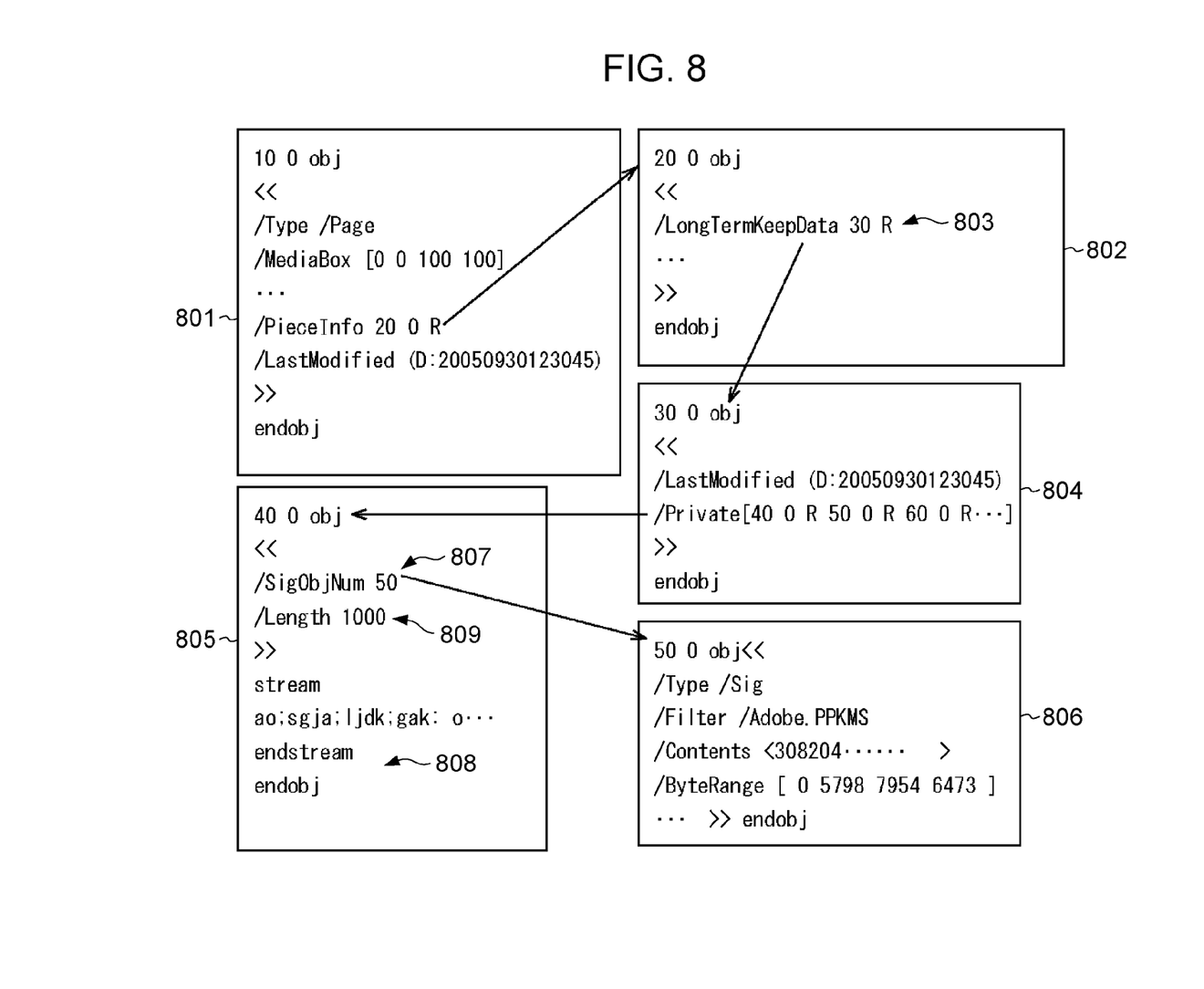
FIG. 8 shows an example of internal data of a long-term storage document according to the embodiment of the present invention.

FIG. 8 shows an example of internal data of a long-term storage document when the processing shown in FIG. 7 is performed. In FIG. 8, the electronic document is a PDF document. However, the electronic document may have any form as long as each of signature data and time-stamp data can be linked with long-term storage data. In FIG. 8, the signature processing unit 303 generates a page-piece dictionary (extended dictionary) 802 linked with a page dictionary 801 to be signed (step S701 of FIG. 7). Then, the signature processing unit 303 generates a long-term storage data key (/LongTerm-KeepData) 803 within the page-piece dictionary 802 (step S701 of FIG. 7). Next, the signature processing unit 303 generates an application data dictionary 804 (step S701 of FIG. 7). Then, the signature processing unit 303 generates a long-term storage data extended stream object 805 (step S701 of FIG. 7).

Next, the signature processing unit 303 generates a signature dictionary (time-stamp dictionary) 806 (step S702 of FIG. 7). Then, the signature processing unit 303 enters, into the stream object 805, an object number (index) 807 of the signature dictionary (time-stamp dictionary) 806, long-term storage data 808, and a data size 809 thereof (step S703 of FIG. 7). In FIG. 8, link information for linking the long-term storage data 808 with the signature dictionary (time-stamp dictionary) 806 is included in the stream object 805, which stores the long-term storage data 808. However, in contrast to this, an object number (index) of the stream object 805 may be included in the signature dictionary (time-stamp dictionary) 806.

Updating of Long-Term Storage Document

An example of the process of time-stamping a long-term storage document will now be described with reference to the flowchart of FIG. 9. First, in step S901, the verification processing unit 304 performs verification processing on a long-term storage document. The processing of step S901 will be described in greater detail below with reference to FIG. 10. Then, in step S902, the long-term storage processing management unit 301 determines whether the long-term storage document has been tampered with, on the basis of the verification performed in step S901. If, in step S902, the long-term storage document has not been tampered with, flow proceeds to step S903; if the long-term storage document has been tampered with, the process is completed.

The processing of steps S903 to S906 is substantially the same as that of steps S505 to S508 in the generation of a long-term storage document shown in of FIG. 5. That is, in step S903, the long-term storage processing management unit 301 obtains a digital certificate 106a for use in the time stamp 107. In step S903, the digital certificate 106a for use in the time stamp 107 is obtained within the period of validity of the digital certificate 104a for the time stamp 105 and while the digital certificate 104a for the time stamp 105 remains unrevoked.

Then, in step S904, the long-term storage data processing unit 302 generates the time-stamp long-term storage data 106 using the digital certificate 106a for use in the time stamp 107. In step S905, the signature processing unit 303 embeds the generated time-stamp long-term storage data 106 into the long-term storage document. In step S906, the signature processing is performed on the long-term storage document by embedding the time stamp 107 into the long-term storage document. Through steps S903 to 906, a long-term storage document shown in FIG. 3 is updated as a long-term storage document shown in FIG. 4. Therefore, an electronic document can be stored for the long term by addition of new time-stamp long-term storage data and a new time stamp into the long-term storage document every time the process of updating the time stamp is performed.

Verification of Long-Term Storage Document

Figure 9:
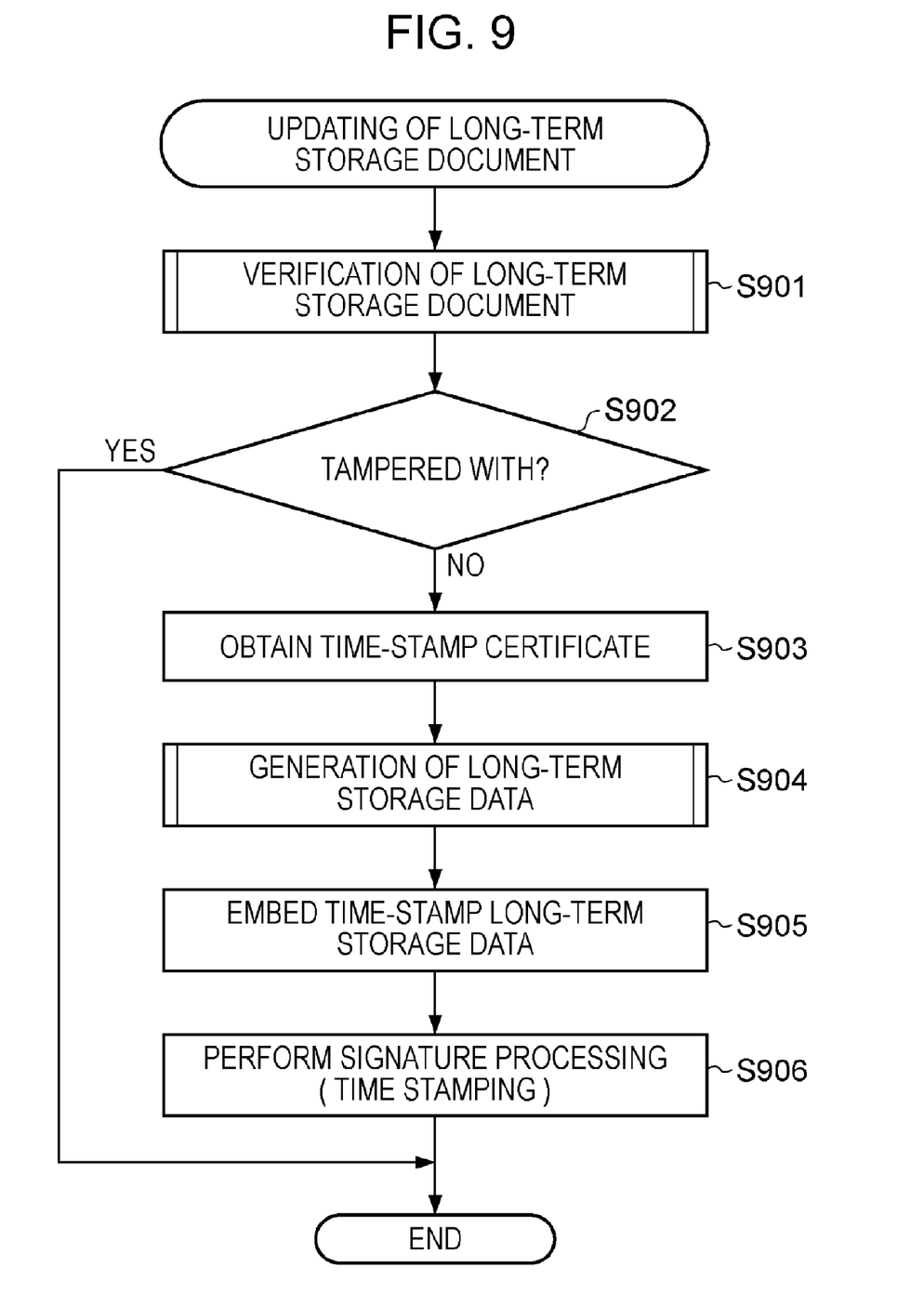
FIG. 9 is a flowchart of an example of the process occurring when a time stamp is placed on a long-term storage document according to the embodiment of the present invention.
Figure 10:
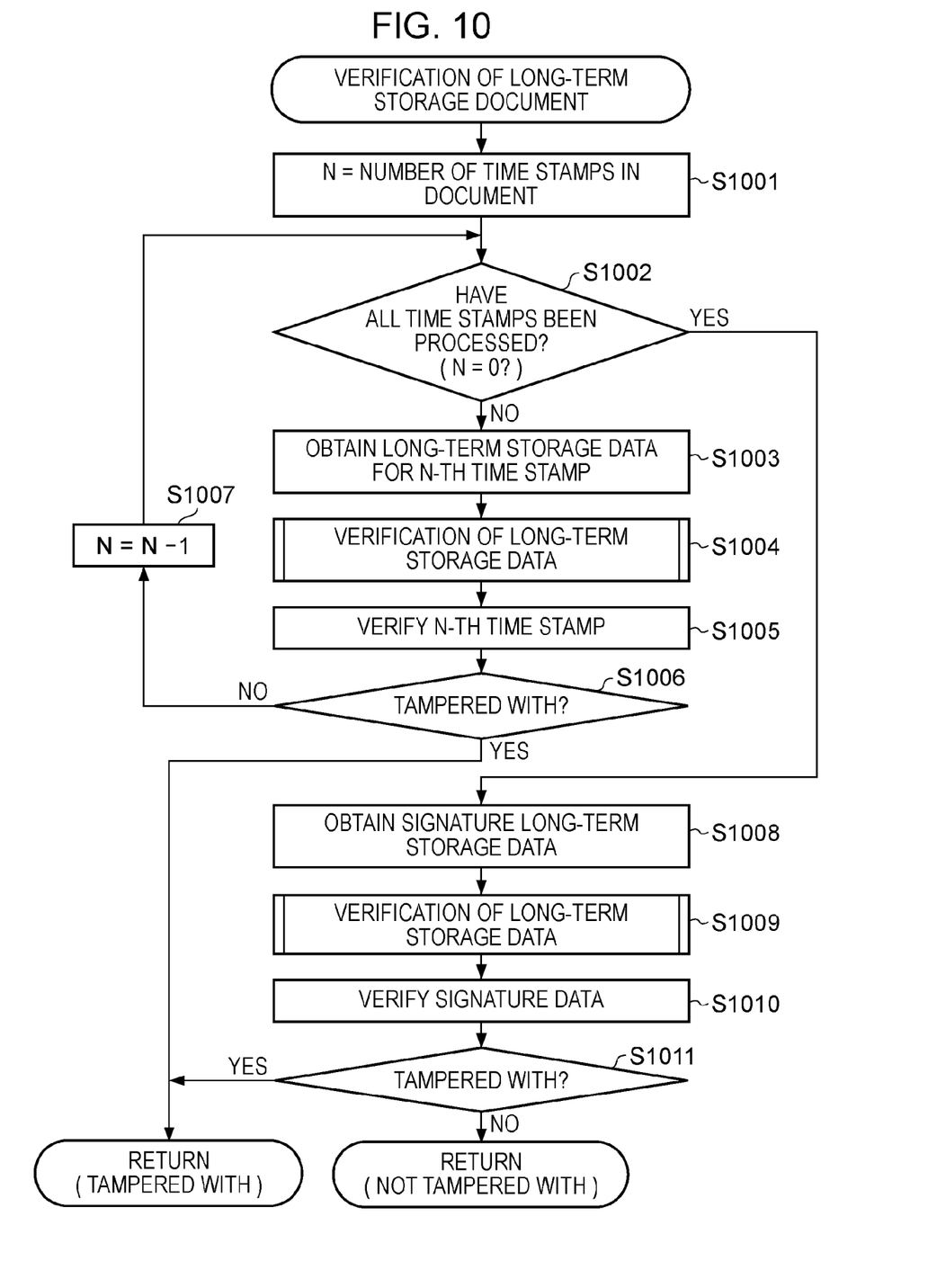
FIG. 10 is a flowchart of an example of the process for verifying a long-term storage document according to the embodiment of the present invention.

FIG. 10 is a flowchart of an example of the process for verifying a long-term storage document shown in step S901 of FIG. 9. This process for verifying a long-term storage document verifies whether the long-term storage document has not been tampered with and whether each of all time stamps was placed within the period of validity thereof. First, in step S1001, the verification processing unit 304 analyzes a long-term storage document, determines the number of time stamps placed on the long-term storage document, and substitutes the determined number of time stamps into a variable N.

Then, in step S1002, the verification processing unit 304 determines whether all time stamps have been verified. If, in step S1002, not all time stamps have been verified, the processing of steps S1003 to S1007 is repeated until the verification is completed. When all time stamps have been verified, flow proceeds to step S1008, which will be described below.

In step S1003, the verification processing unit 304 obtains the time-stamp long-term storage data 106 corresponding to an N-th time stamp from the long-term storage document. That is, the verification processing unit 304 obtains the time-stamp long-term storage data linked with the N-th time stamp by detecting the time-stamp long-term storage data containing the object number of the N-th time stamp from time-stamp long-term storage data sets. Then, in step S1004, the long-term storage data processing unit 302 verifies whether the obtained time-stamp long-term storage data corresponding to the N-th time stamp has not been tampered with. The processing of step S1004 will be described in greater detail below with reference to FIG. 11.

Then, in step S1005, the verification processing unit 304 verifies the time stamp 107 being processed (regular verification). In step S1006, the verification processing unit 304 determines whether both the time-stamp long-term storage data and the time stamp have been tampered with, on the basis of the verification of the time-stamp long-term storage data in step S1004 and the verification of the time stamp in step S1005. If, in step S1006, it is determined that both the time-stamp long-term storage data and the time stamp have not been tampered with, on the verification in steps S1004 and S1005, flow proceeds to step S1007. In step S1007, the verification processing unit 304 subtracts 1 from the variable N, and flow returns to step S1002. If, in step S1006, it is determined that at least one of the both the time-stamp long-term storage data and the time stamp has been tampered with, flow returns to the flowchart of FIG. 9.

If, as a result of the verification of all time stamps and time-stamp long-term storage data, it is determined that none of them has not been tampered with, flow proceeds to step S1008. In step S1008, the verification processing unit 304 obtains the signature long-term storage data 102 by substantially the same manner of step S1003. Then, in step S1009, the long-term storage data processing unit 302 verifies whether the signature long-term storage data 102 has not been tampered with. The processing of step S1009 will be described in greater detail below with reference to FIG. 11.

Next, in step S1010, the verification processing unit 304 verifies the signature data 103. Then, in step S1011, the verification processing unit 304 determines whether both the signature long-term storage data and the signature data have been tampered with, on the basis of the verification of the signature long-term storage data in step S1009 and the verification of the signature data in step S1010. Then, flow returns to the flowchart of FIG. 9.

Verification of Long-Term Storage Data

Figure 11:
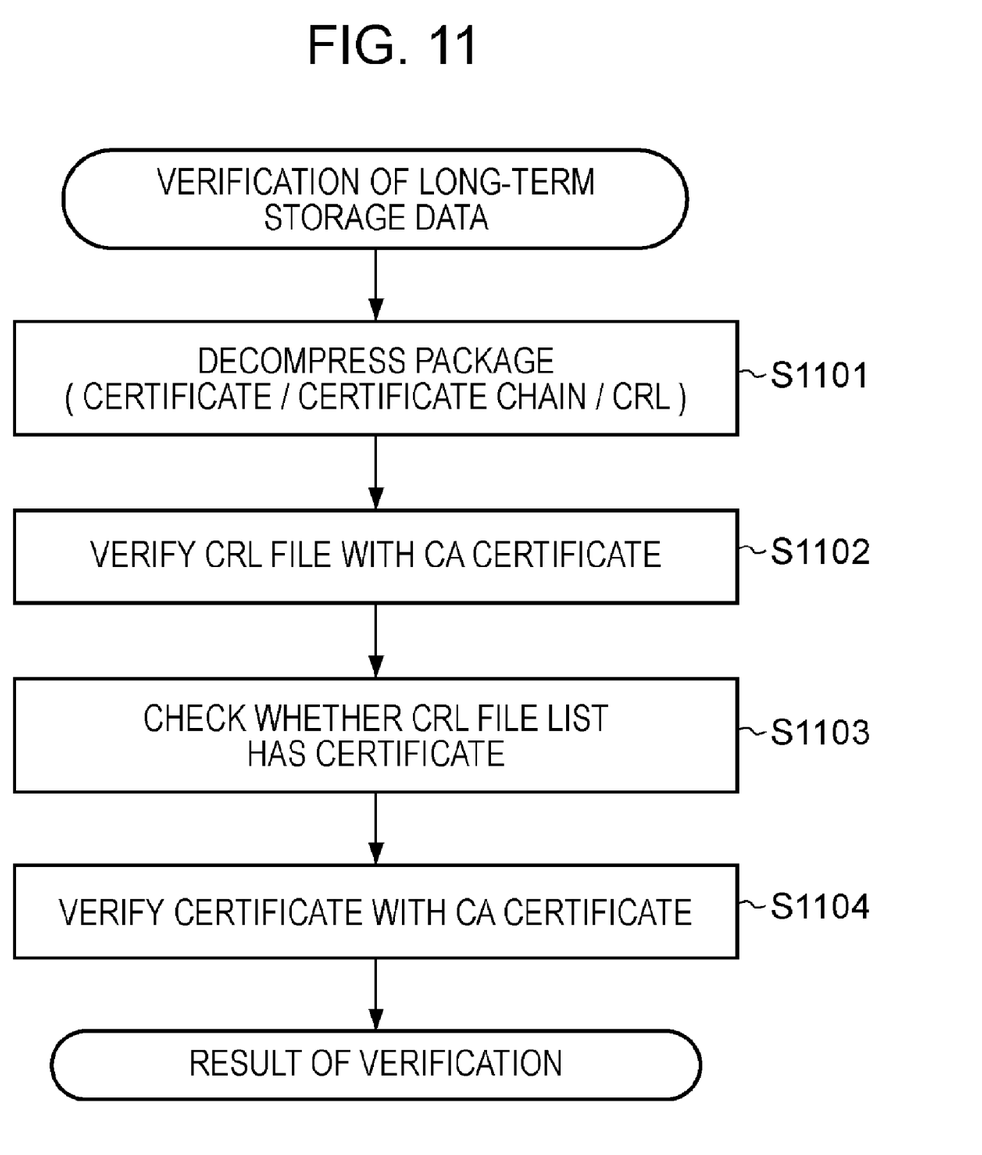
FIG. 11 is a flowchart of an example of the process for verifying long-term storage data according to the embodiment of the present invention.

FIG. 11 is a flowchart of an example of the process for verifying long-term storage data shown in steps S1004 and S1009 of FIG. 10. In step S1101, the long-term storage data processing unit 302 analyzes the packaged long-term storage data 102, packaged long-term storage data 104, and packaged long-term storage data 106. Then, the long-term storage data processing unit 302 obtains the digital certificates 102a, 104a, and 106a, the certificate chains 102b, 104b, and 106b, and the CRLs 102c, 104c, and 106c.

Then, in step S1102, the long-term storage data processing unit 302 verifies each of the files of the CRLs 102c, 104c, and 106c using a CA certificate. In step S1103, the long-term storage data processing unit 302 checks whether the list of each of the files of the CRLs 102c, 104c, and 106c stores a digital certificate. Then, in step S1104, the long-term storage data processing unit 302 verifies each of the digital certificates 102a, 104a, and 106a using the CA certificate. If, all in steps S1102 to S1104, tampering is not detected, the digital certificate for the signature data 103, the time stamp 105, or the time stamp 107 is effective when the signature or time stamp was placed.

As described above, the signature long-term storage data 102 and the time-stamp long-term storage data 104 and 106 are included in the long-term storage document. If the long-term storage data and the long-term storage document are separately managed such that they are association with each other by using a database, portability of an electronic document is decreased. If a link between the long-term storage data and the electronic document is broken, it is very difficult to restore the link therebetween. This results in fragility of the relationship therebetween. In contrast to this, in the present embodiment, as described above, the signature long-term storage data 102 and the time-stamp long-term storage data 104 and 106 are included in the long-term storage document. Therefore, the long-term storage data and the long-term storage document can have a stronger relationship, so the long-term storage data can be prevented from being lost. As a result, it can be verified for the long term that the long-term storage document has not been tampered with. In addition, the portability of an electronic document can be improved.

In the present embodiment, the signature long-term storage data 102 is protected with the signature data 103, and the time-stamp long-term storage data 104 and the time-stamp long-term storage data 106 are protected with the time stamps 105 and 107, respectively. Therefore, reliability of verification of long-term storage data can be improved, and thus the long-term storage document can be more reliably prevented from being tampered with.

Additionally, in the present embodiment, subsequent to embedding of the signature long-term storage data 102 into the long-term storage document, the signature data 103 is embedded in the long-term storage document, in other words, the both embedding operations are performed substantially simultaneously. In addition, subsequent to embedding of the time-stamp long-term storage data 104 and 106 into the long-term storage document, the time stamps 105 and 107 are embedded in the long-term storage document, respectively, in other words, the both embedding operations are performed substantially simultaneously. Therefore, a time lag between when the signature long-term storage data 102 (time-stamp long-term storage data 104 (106)) is embedded and when the signature data 103 (time stamp 105 (107)) is embedded can be reliably prevented. As a result, the long-term storage document can be more reliably prevented from being tampered with.

In the present embodiment, the signature long-term storage data 102 is linked with the signature data 103, and the time-stamp long-term storage data 104 and the time-stamp long-term storage data 106 are linked with the time stamps 105 and 107, respectively. This obviates the necessity to compare each of all long-term storage data with signature data (time stamp). Therefore, in the verification for the long-term storage document, association of signature data (time stamp) with long-term storage data can be quickly determined. Therefore, the time required for the verification of the long-term storage document can be reduced.

As described above, in the present embodiment, the signature long-term storage data 102 (time-stamp long-term storage data 104 (106)) and the signature data 103 (time stamp 105 (107)) are embedded into the electronic document substantially simultaneously. Therefore, link information for linking the signature long-term storage data 102 (time-stamp long-term storage data 104 (106)) with the signature data 103 (time stamp 105 (107)) can be stored in the signature long-term storage data 102 (time-stamp long-term storage data 104 and 106). As a result, private information can be prevented for being stored in the signature data 103 (time stamp 105 (107)). Therefore, for example, in the case where the long-term storage document is a PDF document, in the form suited for the PDF format, the signature long-term storage data 102 (time-stamp long-term storage data 104 (106)) can be linked with the signature data 103 (time stamp 105 (107)).

In the present embodiment, the format of the electronic document is PDF. However, the format of the electronic document is not limited to PDF. The electronic document may have any format as long as it is a structured document, such as a scalable vector graphics (SVG) document.

Other Embodiments

The present invention can also be achieved by supplying program code of software for performing the functions of the above-described embodiment to a computer in an apparatus or a system connected to devices that can operate such that the functions of the above-described embodiment are performed. The scope of the present invention includes a case in which the functions are performed by causing the devices to be operated on the basis of a program stored in the computer (CPU or microprocessor unit (MPU)) in the apparatus or system.

In this case, the program code itself of the software performs the functions of the above-described embodiment. The present invention includes the program code itself and a measure for supplying the program code to a computer, for example, a storage medium that stores the program code. Examples of such a storage medium that stores the program code include, but are not limited thereto, a floppy disk, a hard disk, an optical disk, a magneto-optical disk (MO), a CD-ROM, magnetic tape, a nonvolatile memory card, and a ROM.

The performance of the functions of the above-described embodiment is not limited to the execution of supplied program code by a computer. It should, of course, be understood that the program code can be included in an embodiment of the present invention when the functions of the above-described embodiment are performed by execution of program code in cooperation with an operating system running on a computer or with a software application.

Furthermore, it should be understood that the present invention includes a case in which, after supplied program code is stored in a memory incorporated in a function expansion board in a computer, a CPU in the function expansion board performs some of or all of actual processing in accordance with instructions of the program code, and the processing performs the functions of the above-described embodiment. It should, of course, be understood that the present invention includes a case in which, after supplied program code is stored in a memory incorporated in a function expansion board connected to a computer, a CPU in the function expansion board performs some of or all of actual processing in accordance with instructions of the program code, and the processing performs the functions of the above-described embodiment.

According to the embodiments, long-term storage data indicating that a digital signature for an electronic document is valid is embedded into the electronic document, and the electronic document is signed with a digital signature whose validity can be verified using the long-term storage data. Therefore, the long-term storage data can be prevented from being lost. As a result, it can be verified for the long term that the long-term storage document has not been tampered with. In addition, the portability of electronic documents can be improved.

According to another feature of the embodiments, embedding of long-term storage data into an electronic document is performed substantially simultaneously with signing of the electronic document with a digital signature whose validity can be verified using the long-term storage data. Therefore, the electronic document can be more reliably prevented from being tampered with.

According to another feature of the embodiments, long-term storage data is associated with a digital signature whose validity can be verified using the long-term storage data. Therefore, in the verification that electronic document has not been tampered with, what signature data (time stamp) corresponds to what long-term storage data can be quickly determined. Therefore, the verification that electronic document has not been tampered with can be quickly performed.

According to another feature of the embodiments, an electronic document in which long-term storage data is embedded is singed with a digital signature whose validity can be verified using the long-term storage data embedded in the electronic document. Therefore, long-term storage data itself can be protected with a digital signature, and thus and thus the long-term storage document can be more reliably prevented from being tampered with.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-134320 filed May 12, 2006, which is hereby incorporated by reference herein in its entirety.

What is claimed is:

1. An electronic document management apparatus, comprising:
    at least one processor coupled via a bus to a memory, wherein the at least one processor is configured to control:
    a first embedding unit configured to embed, into an electronic document to create a first embedded electronic document, digital signature long-term storage data and digital signature data for verifying validity of an electronic document including the digital signature long-term storage data;
    a second embedding unit configured to embed, into the first embedded electronic document to create a second embedded electronic document, time-stamp long-term storage data and time-stamp data for verifying validity of an electronic document including the time-stamp long-term storage data;
    a confirmation unit configured to confirm an object number of time-stamp data embedded in the second embedded electronic document when the second embedded electronic document is updated;
    a first obtaining unit configured to obtain embedded time-stamp long-term storage data and embedded time-stamp data among time stamps embedded in the second embedded electronic document, wherein the first obtaining unit obtains both the time-stamp long-term storage data and the time-stamp data by the object number of time-stamp data confirmed by the confirmation unit;
    a first verification unit configured to verify whether both the time-stamp long-term storage data and the time-stamp data obtained by the first obtaining unit have been tampered with, wherein, in a case where the first verification unit verifies that both a most recently embedded time-stamp long-term storage data and a most recently embedded time-stamp data have been tampered with, the first obtaining unit stops processing, and, in a case where the first verification unit verifies that both the most recently embedded time-stamp long-term storage data and the most recently embedded time-stamp data have not been tampered with, the first obtaining unit obtains a second most recently embedded time-stamp long-term storage data and a second most recently embedded time-stamp data relative to data previously verified by the first verification unit;
    a second obtaining unit configured to obtain, in a case where the first verification unit verifies that both the time-stamp long-term storage data and the time-stamp data obtained by the first obtaining unit have not been tampered with, digital signature long-term storage data and digital signature data embedded in the second embedded electronic document;
    a second verification unit configured to verify whether both the digital signature long-term storage data and the digital signature data obtained by the second obtaining unit have been tampered with; and
    a third embedding unit configured to, in a case where the second verification unit verifies that both the time-stamp long-term storage data and the time-stamp data have been tampered with, obtain a time-stamp certificate from a certificate authority, generate time-stamp long-term storage data and time-stamp data based on the time-stamp certificate, and embed the generated time-stamp long-term storage data and time-stamp data into the second embedded electronic document.

2. The electronic document management apparatus according to claim 1, wherein the digital signature long-term storage data and the time-stamp long-term storage data include the time-stamp certificate obtained from the certificate authority, a certificate chain including all digital certificates on a certificate path to the certificate authority, and a revocation information list for confirming whether the time-stamp certificate obtained from the certificate authority has been revoked.

3. A method for an electronic document management apparatus, the method comprising:
    using at least one processor coupled via a bus to a memory to control:
    embedding, into an electronic document to create a first embedded electronic document, digital signature long-term storage data and digital signature data for verifying validity of an electronic document including the digital signature long-term storage data;
    embedding, into the first embedded electronic document to create a second embedded electronic document, time-stamp long-term storage data and time-stamp data for verifying validity of an electronic document including the time-stamp long-term storage data;
    confirming an object number of time-stamp data embedded in the second embedded electronic document when the second embedded electronic document is updated;
    obtaining embedded time-stamp long-term storage data and embedded time-stamp data among time stamps embedded in the second embedded electronic document, wherein obtaining includes obtaining both the time-stamp long-term storage data and the time-stamp data by the confirmed object number of time-stamp data;
    verifying whether both the obtained time-stamp long-term storage data and the time-stamp data have been tampered with, wherein, in a case where verifying verifies that both a most recently embedded time-stamp long-term storage data and a most recently embedded time-stamp data have been tampered with, stopping obtaining processing, and, in a case where verifying verifies that both the most recently embedded time-stamp long-term storage data and the most recently embedded time-stamp data have not been tampered with, obtaining includes obtaining a second most recently embedded time-stamp long-term storage data and a second most recently embedded time-stamp data relative to data previously verified;
    obtaining, in a case where verifying verifies that both the obtained time-stamp long-term storage data and the obtained time-stamp data have not been tampered with, digital signature long-term storage data and digital signature data embedded in the second embedded electronic document;
    verifying whether both the obtained digital signature long-term storage data and the obtained digital signature data have been tampered with; and in a case where verifying verifies that both the obtained time-stamp long-term storage data and the obtained time-stamp data have been tampered with, obtaining a time-stamp certificate from a certificate authority, generating time-stamp long-term storage data and time-stamp data based on the time-stamp certificate, and embedding the generated time-stamp long-term storage data and time-stamp data into the second embedded electronic document.

4. The method according to claim 3, wherein the digital signature long-term storage data and the time-stamp long-term storage data include the time-stamp certificate obtained from the certificate authority, a certificate chain including all digital certificates on a certificate path to the certificate authority, and a revocation information list for confirming whether the time-stamp certificate obtained from the certificate authority has been revoked.

5. An electronic document management apparatus, comprising:
   an embedding unit configured to embed, into an electronic document to create an first embedded electronic document, a time stamp and long-term storage data including a digital certificate for the time stamp, wherein the embedding unit embeds the time stamp and the long-term storage data including the digital certificate for the time stamp to be embedded into the first embedded electronic document every time the first embedded electronic document is updated;
   a verification unit configured to verify whether, in the first embedded electronic document into which N (N>1) time stamps and N pieces of long-term storage data are embedded by the embedding unit, each of the N time stamps has been tampered with, and each of the N pieces of long-term storage data has been tampered with; and
   an output unit configured to output a result that the first embedded electronic document has not been tampered with in a case where the verification unit determines that none of the time stamps and the long-term storage data has been tampered with, and to output a result that the first embedded electronic document has been tampered with in a case where the verification unit determines that any one of the time stamps and the long-term storage data has been tampered with.

6. The electronic document management apparatus according to claim 5,
   wherein the embedding unit further embeds, into the first embedded electronic document to create a second embedded electronic document, signature long-term storage data including a digital certificate required for placing a digital signature and signature data whose effective area is the second embedded electronic document and the long-term storage data,
   wherein the verification unit further verifies whether the signature long-term storage data has been tampered with and whether the signature data has been tampered with, after verifying whether the time stamps have been tampered with and the long-term storage data has been tampered with, and
   wherein the output unit outputs a result that the second embedded electronic document has not been tampered with in a case where the verification unit determines that neither the time stamps nor the digital signature have been tempered with, and outputs a result that the second embedded electronic document has been tampered with in a case where the verification unit determines that any one of the time stamps and the digital signature has been tampered with.

7. The electronic document management apparatus according to claim 6, further comprising:
   an obtaining unit configured to obtain a digital certificate,
   wherein the obtaining unit obtains the digital certificate required for placing the digital signature from a CA (certification authority) and obtains the digital certificate for the time stamps from a TSA (Time Stamp Authority).

\* \* \* \* \*